(12) United States Patent
Panza et al.

(10) Patent No.: US 12,239,972 B2
(45) Date of Patent: Mar. 4, 2025

(54) RADIAL OR AXIAL-RADIAL CHEMICAL REACTOR WITH A FINE CATALYST

(71) Applicant: CASALE SA, Lugano (CH)

(72) Inventors: Sergio Panza, Como (IT);
Pierdomenico Biasi, Como (IT);
Ermanno Filippi, Castagnola (CH)

(73) Assignee: CASALE SA, Lugano (CH)

( * ) Notice: Subject to any disclaimer, the term of this patent is extended or adjusted under 35 U.S.C. 154(b) by 297 days.

(21) Appl. No.: 17/278,486

(22) PCT Filed: Oct. 7, 2019

(86) PCT No.: PCT/EP2019/077019
§ 371 (c)(1),
(2) Date: Mar. 22, 2021

(87) PCT Pub. No.: WO2020/088886
PCT Pub. Date: May 7, 2020

(65) Prior Publication Data
US 2022/0032251 A1    Feb. 3, 2022

(30) Foreign Application Priority Data

Oct. 29, 2018 (EP) .................................... 18203181

(51) Int. Cl.
*B01J 8/02*     (2006.01)
*B01J 8/00*     (2006.01)
(Continued)

(52) U.S. Cl.
CPC .............. *B01J 8/0214* (2013.01); *B01J 8/009* (2013.01); *B01J 35/40* (2024.01); *B01J 35/51* (2024.01);
(Continued)

(58) Field of Classification Search
None
See application file for complete search history.

(56) References Cited

U.S. PATENT DOCUMENTS 3,409,411 A * 11/1968 Mosley .................... B01J 8/125
                                                         422/219
3,662,886 A *  5/1972 Kennedy, Jr. ............. B07B 1/30
                                                         209/250
(Continued)

FOREIGN PATENT DOCUMENTS

EP          2014356 A1      1/2009

OTHER PUBLICATIONS

ASTM D4513-11: Standard Test Method for Particle Size Distribution of Catalytic Materials by Sieving. Edition published Aug. 2011. (Year: 2011).*

(Continued)

*Primary Examiner* — Jennifer A Leung
(74) *Attorney, Agent, or Firm* — Dorsey & Whitney LLP

(57) ABSTRACT

Reactor for catalytic chemical reactions comprising a catalyst bed with an annular-cylindrical form crossed by a radial flow or mixed axial-radial flow, wherein the bed is delimited by cylindrical walls made gas-permeable by means of slits and the catalyst bed is formed by particles of catalyst with a nominal minimum size such that: the ratio between a transverse dimension of the slits and the nominal minimum size of the particles of catalyst is smaller than or equal to 0.6; the catalyst bed contains no more than 3% by weight of particles with an actual size smaller than said nominal size.

11 Claims, 2 Drawing Sheets

(51) Int. Cl.
  *B01J 35/40* (2024.01)
  *B01J 35/51* (2024.01)
  *C01C 1/04* (2006.01)

(52) U.S. Cl.
  CPC ... *C01C 1/0435* (2013.01); *B01J 2208/00805* (2013.01); *B01J 2208/0092* (2013.01)

(56) References Cited

U.S. PATENT DOCUMENTS

| | | | | |
|---|---|---|---|---|
| 3,948,764 | A * | 4/1976 | Edwards | B07B 1/46 |
| | | | | 209/250 |
| 4,737,269 | A * | 4/1988 | Bischoff | B01J 8/003 |
| | | | | 209/23 |
| 5,485,923 | A * | 1/1996 | Schrepfer | B07B 1/00 |
| | | | | 209/373 |
| 5,827,485 | A | 10/1998 | Libal et al. | |
| 8,158,074 | B2 * | 4/2012 | Filippi | B01J 8/0085 |
| | | | | 422/239 |
| 2005/0161373 | A1 * | 7/2005 | Tazawa | B01J 8/003 |
| | | | | 209/400 |
| 2011/0319691 | A1 | 12/2011 | Sun et al. | |
| 2019/0127298 | A1 * | 5/2019 | Serban | B01J 8/0214 |

OTHER PUBLICATIONS

ASTM D4513-11 (2017): Standard Test Method for Particle Size Distribution of Catalytic Materials by Sieving. Edition published Feb. 2017. (Year: 2017).*
ASTM E11-17: Standard Specification for Woven Wire Test Sieve Cloth and Test Sieves. Edition published Apr. 2017. (Year: 2017).*
International Preliminary Report on Patentability for International Application No. PCT/EP2019/077019 mailed Oct. 8, 2020.
International Search Report from International Application No. PCT/EP2019/077019 mailed Nov. 19, 2019.

* cited by examiner

RADIAL OR AXIAL-RADIAL CHEMICAL REACTOR WITH A FINE CATALYST

FIELD OF APPLICATION

The invention relates to the technical field of catalytic chemical reactors. The invention relates in particular to a reactor with a radial or axial-radial flow catalyst bed.

PRIOR ART

A reactor with a radial or axial-radial flow catalyst bed comprises a catalyst bed with a cylindrical annular form delimited by at least a first and second gas-permeable cylindrical wall. Reactors of this type are widely used for example for ammonia synthesis.

Said walls have the task of retaining the particles of catalyst and of distributing a gaseous flow containing the reagents and, respectively, collecting a gaseous flow containing the reaction products. For this reason said walls are also termed distributor and collector.

The gas-permeable feature is obtained by providing the walls with suitable openings. Typically these walls are made with perforated metal sheets.

The catalyst is normally in the form of granules. The catalyst is therefore characterized by a certain particle size which may be more or less fine.

It is known that a catalyst with a fine particle size is advantageous for the purposes of the process. For the same available volume of the catalyst bed, a fine catalyst allows closer and more uniform contact with the reagents and improves the yield compared to a catalyst with a larger particle size.

The use of a fine catalyst, however, poses a number of problems. It is necessary to reduce the size of the holes or the slits of the perforated walls in order to retain the catalyst. Reducing the size of the holes and the slits however gives rise to problems. A first problem is the increased risk of obstruction of the perforated walls owing to the catalyst dust. A second problem is the weakening of the walls since a reduction in the size of the passages results in the need to make several passages close to one another in order to keep the flow cross-section unchanged. A metal sheet with closely arranged perforations is weakened and exposed to failure or instability.

One measure which seeks to solve this problem provides lining the walls with a metal net of a suitably fine mesh. It has been seen however that such a net is easily exposed to damage and failure, especially in the presence of severe temperature and pressure and/or chemical attack conditions in the reactor. This solution therefore is not satisfactory.

For this reason there is a tendency to use a catalyst formed by particles which have dimensions greater than 1.5 mm. The reactors of the prior art do not offer a satisfactory solution for using catalysts with a finer particle size.

SUMMARY OF THE INVENTION

The invention aims to overcome the drawbacks of the prior art and allow, in a radial or axial-radial flow catalytic chemical reactor, using a catalyst with a particularly fine particle size without adversely affecting the function and reliability of the perforated walls which delimit the bed and retain the particles of catalyst.

This object is achieved with a catalytic chemical reaction reactor comprising a catalyst bed having an annular-cylindrical form and having a crossing with a radial flow or mixed axial-radial flow; at least a first cylindrical wall and a second cylindrical wall which delimit the catalyst bed being in direct contact with the catalyst, the second wall being coaxial with and inside the first wall; wherein said first wall and said second wall comprise passages to make them gas-permeable and wherein:

said passages are slits having an elongated form with a respective longitudinal dimension in a longitudinal direction of the slit and a respective transverse dimension in a transverse direction which is perpendicular to the said longitudinal direction;

the catalyst bed is formed by particles of catalyst which have a nominal minimum size;

the ratio between said transverse dimension of the slits and said nominal minimum size of the particles of catalyst is less than or equal to 0.6;

the catalyst bed contains no more than 3% by weight of particles with an actual size smaller than said nominal minimum size.

The size of the catalyst granules can be defined as the diameter in the case of granules with a spherical shape or equivalent diameter in the case of granules with a different or irregular shape. The equivalent diameter of a non-spherical particle can be defined as the diameter of a sphere having the same volume as the non-spherical particle.

The size of the catalyst granules can also be defined operatively by sieving the catalyst with one or more wire meshes having a suitable square free flow area. In this respect, reference is made to square sieves, i.e. sieves having square free flow passages. Granules of irregular shape can be described to have a size between d1 and d2 (wherein d2 is greater than d1) when the granules are retained by a sieve with a square free flowing area of d1^2 and can flow through (i.e. are not retained by) a sieve with a square free flowing area of d2^2.

A minimum size d1 of a catalyst can be defined on the basis of the maximum square free flowing area A* of a sieve which retains the catalyst. More particularly, it can be assumed that the minimum size d1 is equal to the square root of said area A*.

The determination of the size by sieving the catalyst can be performed, preferably, according to the standard test method disclosed in ASTM D4513-11 and particularly according to the standard specification of ASTM E11-17.

Preferably, a catalyst of irregular shape has granules with a sphericity greater than a certain threshold. Sphericity of a particle is defined as the ratio of the surface area of a sphere (with the same volume as the particle) to the surface area of the particle. A perfect sphere has a sphericity of 1; a sphericity close to 1 therefore denotes particles which resembles a sphere whilst a lower sphericity denotes particles which deviates substantially from the spherical shape. Preferably the sphericity of the granules of catalyst is 0.4 or greater, more preferably 0.5 or greater.

The size of the catalyst particles generally follows a statistical distribution, for example a normal (Gaussian curve) distribution. The commercially available catalysts are delivered with an indication of a nominal minimum size and a nominal maximum size, for example 1-2 mm.

Said minimum and maximum sizes are declared values; a commercially available catalyst may nevertheless contain granules with a size smaller than the declared minimum size or greater than the declared maximum size.

This is due to the fact that the commercially available catalyst, in the form of granules, is obtained by breaking down a mass (ingot) of catalyst into particles. The breaking-down process is calibrated to obtain a desired target size of the granules, but inevitably generates granules with a size different from the target. The tendency of the catalyst to crumble forms a significant number of particles below the expected minimum size. The applicant has found that the granules with a size smaller than the minimum declared size may form about 5% of the weight of the catalyst.

The finer part of the catalyst is responsible for obstruction of the permeable walls.

The applicant has found that the aforementioned conditions, i.e. a ratio between transverse dimension of the slits and minimum size of the granules smaller than or equal to 0.6 and catalyst containing no more than 3% by weight of particles below the minimum size, result in a degree of obstruction which is surprisingly small.

Therefore, by following the aforementioned conditions, it is possible to use a particularly fine catalyst.

Preferably said nominal minimum size of the catalyst particles is less than 1.5 mm, preferably less than or equal to 1.2 mm and more preferably less than or equal to 1 mm. Preferably said size is equal to 1 mm.

Preferably the transverse dimension of the slits is less than or equal to 1 mm, preferably 0.5 mm to 0.8 mm and more preferably 0.5 mm to 0.6 mm. Preferably said dimension is equal to 0.6 mm.

In a preferred embodiment the minimum size of the particles is 1 mm and the transverse dimension of the slits is 0.6 mm.

More advantageously the catalyst bed contains no more than 2% by weight of particles with an actual size smaller than said nominal size, and even more advantageously no more than 1.5% by weight.

Said quantity of particles with an actual size smaller than said nominal size can be determined by means of a square mesh sieve, said square mesh having a side equal to said nominal minimum size of the catalyst granules.

The reactor according to the invention preferably is adapted to convert a gaseous flow of reagents so as to obtain a gaseous flow of products. For example in a preferred application the reactor is a reactor for synthesis of ammonia from a make-up gas containing hydrogen and nitrogen.

An object of the invention is also a method for loading catalyst into a reactor for catalytic chemical reactions according to the accompanying claims.

DETAILED DESCRIPTION OF A PREFERRED EMBODIMENT

Figure 1:
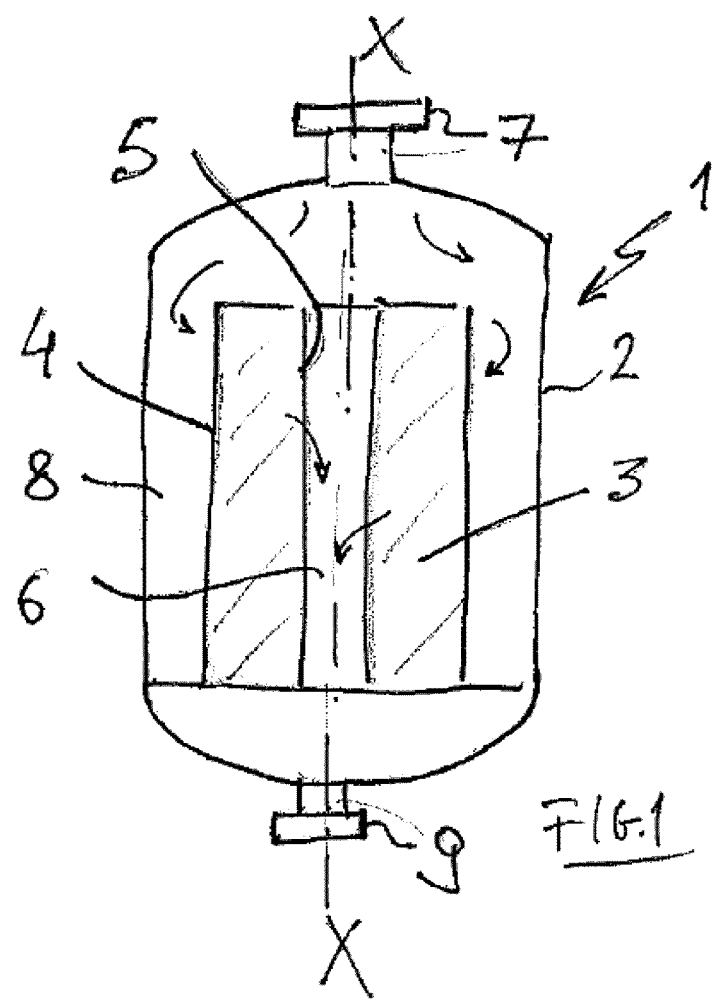
FIG. 1 shows in schematic form a radial flow reactor.

FIG. 1 shows in schematic form a reactor 1 which comprises: a shell 2, a catalyst bed 3, a first perforated cylindrical wall 4, a second perforated cylindrical wall 5, and a central collector 6

A gaseous flow of reagents entering the inlet 7 crosses the bed radially from the space 8 towards the central collector 6 and, from the latter, reaches the outlet flange 9.

The flow crossing the catalyst bed may be directed towards the centre (inward flow) as in FIG. 1 or directed towards the outside (outward flow).

The catalyst bed 3 has a cylindrical annular form with a substantial radial symmetry about an axis X-X.

In some embodiments the bed 3 and the perforated walls 4, 5 are part of a cartridge removable from the shell 2.

Figure 2:
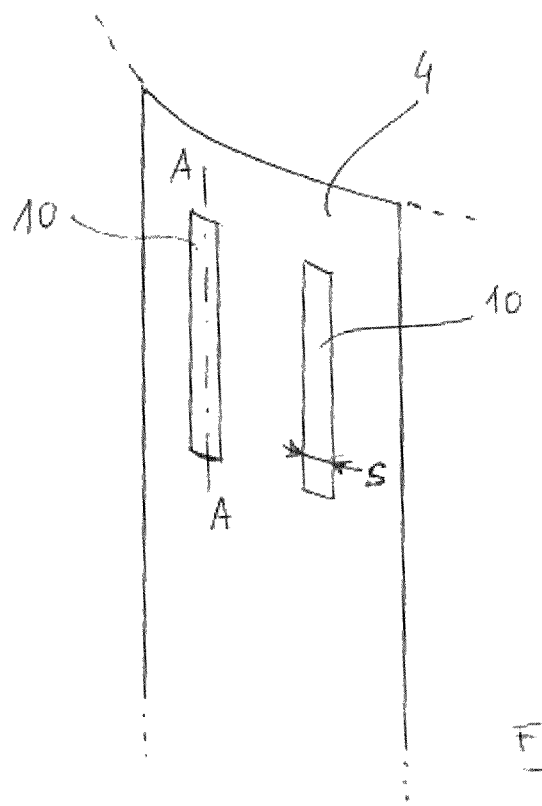
FIG. 2 shows a part of a perforated wall of the reactor according to FIG. 1.

FIG. 2 shows a detail of the first perforated wall 4 which has slits 10 which make the wall gas-permeable. The perforated wall 5 is realized in a similar manner. The figure shows for easier illustration a section of the cylindrical wall.

Each of the slits 10 has an elongated shape and extends mainly along a longitudinal axis A-A. In a transverse direction, which is perpendicular to said axis A-A, the slits have a dimension of width s.

The relationship between said dimension s and the size of the particles of catalyst essentially determines the ability of the slit 10 to retain the same catalyst.

The perforated walls 4 and 5 have advantageously slits 10 with the same dimension s.

Figure 3:
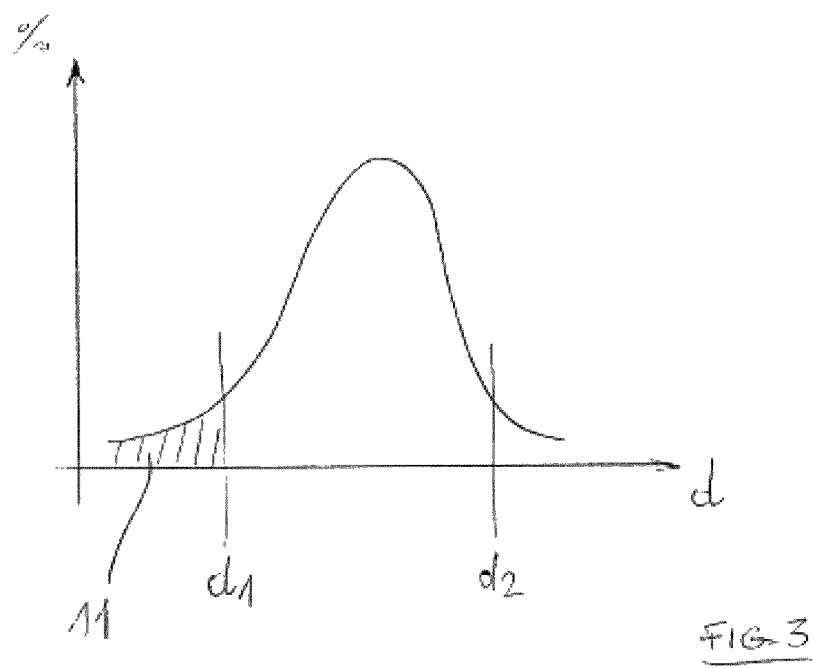
FIG. 3 shows the statistical distribution of the size of granules of a catalyst.

FIG. 3 shows a typical statistical distribution of the size of particles of a commercial catalyst which has a minimum declared particle size $d_1$ and maximum declared particle size $d_2$. For example a catalyst with a commercially declared size of 1-2 mm has $d_1=1$ mm and $d_2=2$ mm.

The ratio between said transverse dimension s of the slits 10 of both the walls 4 and 5 and said nominal minimum size $d_1$ of the particles of catalyst is less than or equal to 0.6. Moreover the catalyst bed 3 contains no more than 3% by weight of particles with a size smaller than $d_1$.

The particles of catalyst with a size smaller than $d_1$ are indicated by the area 11 in FIG. 3.

It has been found that a particularly advantageous embodiment is obtained with s=0.6 mm and $d_1=1$ mm.

EXAMPLE

Different types of catalyst were tested in order to assess their tendency to obstruct the slits in a permeable wall. A flat sheet-metal wall with slits having an average length of 60 mm and width of 0.6 mm, located at the bottom of a tube, was used.

The tube was filled with catalyst and then water run through it for a period of 10 hours. At the end of the test the degree of occlusion of the slits due to the particles of catalyst was assessed.

Using an industrial catalyst with nominal dimensions of 1.5-3 mm a degree of occlusion ranging from 2% to 3% of the total available through-flow area was observed.

Using an industrial catalyst with nominal dimensions of 1-2 mm containing more than 5% by weight of particles with size smaller than 1 mm a degree of occlusion ranging from 10% to 30% of the total available through-flow area was observed.

Using a catalyst sieved according to the invention, containing less than 3% by weight of particles with a size smaller than 1 mm, a degree of occlusion of the total available through-flow area ranging from 3% to 5% was observed.

The invention claimed is:

1. A reactor for catalytic chemical reactions, the reactor comprising:
    a catalyst bed with an annular-cylindrical form and a radial or mixed axial-radial crossing flow;
    at least a first cylindrical wall and a second cylindrical wall that delimit the catalyst bed being in direct contact with a catalyst, the second cylindrical wall being coaxial and internal relative to the first cylindrical wall;
    wherein the first cylindrical wall and the second cylindrical wall include passages to make the first and second cylindrical walls gas-permeable;

wherein the passages are slits having an elongated form in a longitudinal direction of each slit of the slits and a respective transverse dimension in a transverse direction that is perpendicular to the longitudinal direction;

wherein the catalyst bed is formed by particles of the catalyst that have a nominal minimum size such that:
a) a ratio between the transverse dimension of the slits and the nominal minimum size of the particles of the catalyst is less than or equal to 0.6;
b) the catalyst bed contains no more than 3% by weight of particles with a size smaller than the nominal minimum size, wherein the nominal minimum size of the particles of the catalyst is defined as a square root of a maximum square free flow area of a sieve that retains the particles of the catalyst, sieving of the particles of the catalyst being performed according to the standard test method of ASTM D4513-11.

2. The reactor according to claim 1, wherein the nominal minimum size of the particles of the catalyst is smaller than 1.5 mm.

3. The reactor according to claim 1, wherein the transverse dimension of the slits is smaller than or equal to 1 mm.

4. The reactor according to claim 1, wherein the particles of the catalyst include spherical particles of the catalyst.

5. The reactor according to claim 1, wherein the particles of the catalyst includes non-spherical particles of the catalyst.

6. The reactor according to claim 1, wherein the catalyst bed contains no more than 2% by weight of the particles of the catalyst with a size smaller than the nominal minimum size.

7. The reactor according to claim 1, wherein a quantity of the particles of the catalyst with a size smaller than the nominal minimum size is determined with the sieve having a square mesh with a side equal to the nominal minimum size.

8. The reactor according to claim 1, wherein the catalyst bed and the cylindrical walls are part of a cartridge which can be extracted from a shell of the reactor.

9. The reactor according to claim 1, wherein said catalyst is configured for converting a gaseous flow of reagents so as to obtain a gaseous flow of products.

10. The reactor according to claim 1, wherein said catalyst is configured for performing ammonia synthesis using a make-up gas containing hydrogen and nitrogen.

11. A method for loading catalyst into a reactor for catalytic chemical reactions wherein:

the reactor includes at least a first cylindrical wall and a second cylindrical wall that delimit a space able to contain the catalyst, the second wall being coaxial and internal relative to the first cylindrical wall, so that loading of the catalyst between the first and second cylindrical walls forms a cylindrical-annular catalyst bed with a radial or axial-radial crossing flow;

the first cylindrical wall and the second cylindrical wall comprise passages to make the first and second cylindrical walls gas-permeable, one cylindrical wall of the first and second cylindrical walls being adapted to act as a distributor of a gaseous flow containing reagents and the other cylindrical wall of the first and second cylindrical walls being adapted to act as a collector of a gaseous flow containing reaction products;

wherein the passages are slits having an elongated form with a respective longitudinal dimension in a longitudinal direction of each slit of the slits and a respective transverse dimension in a transverse direction which is perpendicular to the longitudinal direction;

wherein the catalyst to be loaded is formed by particles of the catalyst which have a nominal minimum size;

wherein a ratio between the transverse dimension of the slits and the nominal minimum size of the particles of the catalyst is less than or equal to 0.6;

wherein the nominal minimum size of the catalyst is defined as a square root of a maximum square free flow area of a sieve which retains the catalyst, sieving of the particles of the catalyst being performed according to the standard test method of ASTM D4513-11, the method comprising:
said sieving of the particles of the catalyst being performed before introducing the catalyst into the reactor so that the catalyst contains no more than 3% by weight of the particles of the catalyst with a size smaller than the nominal minimum size.

* * * * *